United States Patent [19]

Le Mouel et al.

[11] Patent Number: 4,682,334

[45] Date of Patent: Jul. 21, 1987

[54] SYNCHRONOUS DATA TRANSMISSION METHOD AND DEVICE IMPLEMENTING SAME

[75] Inventors: Bernard Le Mouel, Saint Quay Perros; Hervé Le Bescont; Jean-Paul Le Meur, both of Lannion, all of France

[73] Assignee: Compagnie Industrielle Des Telecommunications Cit-Alcatel, France

[21] Appl. No.: 736,038

[22] Filed: May 20, 1985

[30] Foreign Application Priority Data

May 23, 1984 [FR] France ................. 84 08084

[51] Int. Cl.$^4$ .................. H03K 5/26; G08C 25/00
[52] U.S. Cl. ........................ 371/55; 371/49; 375/19
[58] Field of Search ............ 371/47, 49, 55, 56; 178/69 D; 375/19

[56] References Cited

U.S. PATENT DOCUMENTS

| | | | |
|---|---|---|---|
| 3,631,471 | 12/1971 | Griffiths | 371/55 X |
| 3,646,517 | 2/1972 | Waters | 371/47 X |
| 3,840,854 | 10/1974 | Franaszek | 178/69 D X |
| 4,264,972 | 4/1981 | Drullmann | 371/56 X |
| 4,309,694 | 1/1982 | Henry | 371/55 X |
| 4,502,143 | 2/1985 | Kato . | |

FOREIGN PATENT DOCUMENTS

| 13836 | 1/1982 | Japan | 371/47 |
| 207457 | 12/1982 | Japan | 371/49 |

Primary Examiner—Jerry Smith
Assistant Examiner—Robert W. Beausoliel, Jr.
Attorney, Agent, or Firm—Sughrue, Mion, Zinn, Macpeak and Seas

[57] ABSTRACT

A synchronous data transmission method uses an MB 1C 1F type binary-binary code in which the binary data to be transmitted is subdivided into successive blocks of M bits complemented when they feature a disparity (marks minus spaces) of the same sign as the data already encoded, to which is added a complement bit indicating if complementing has been applied and a frame bit consisting of a parity bit enabling the subdivision into blocks carried out at the encoding stage to be recovered at the decoding stage. The encoder has at the input a demultiplexer carrying out the subdivision into blocks followed by circuits for computing the word digital sum and parity and the running digital sum, together with an inverter circuit which processes the blocks from the multiplexer and their parity bit under the control of a complementing decision circuit and a multiplexer transforming the encoded binary signal from the inverter circuit into an isochronous sequence to which a frame bit is added.

12 Claims, 4 Drawing Figures

SYNCHRONOUS DATA TRANSMISSION METHOD AND DEVICE IMPLEMENTING SAME

BACKGROUND OF THE INVENTION

1. Field of the invention

The present invention concerns the synchronous transmission of data at very high bit rates, in particular over optical fiber links.

2. Description of the prior art

On a data transmission link, the data is transmitted in the form of a sequence of isochronous symbols having zero DC energy content and little energy content at low frequencies in order to simplify monitoring the level of the transmission sources and the gain of the receivers, to simplify equalization and to enable transmission over the same medium of service channels and remote supervisory channels processed by separate equipment in the terminals and at intermediate regeneration points. This sequence of symbols is produced from the data using a redundant code providing for the transmission of symbol timing information needed for their recovery and transmission quality information.

In the case of optical fiber links, use is preferably made of a binary type two-level line signal because of non-linearities of the optical source and its temperature dependence. The binary-binary code used is generally an nBmB type block code with multiple alphabets and a limited digital sum which converts blocks of n bits into blocks of m bits, m being greater than n, in such a way that the difference between the numbers of ones or marks and zeros or spaces transmitted is null on average. This type of redundant code does not utilize all possible configurations of the blocks of m bits. It enables those least favorable to timing recovery to be eliminated and provides for the reservation of certain configurations which cannot be imitated by a succession of bits belonging to two consecutive blocks of m bits authorized for use to synchronize the blocks. It further provides for detecting line errors by monitoring the appearance of unauthorized configurations of blocks of m bits at the receiving end. Unfortunately, its use entails somewhat complex manipulation of the bits which is difficult to implement for very high bit rates, since the limiting operating speeds of modern semiconductor technologies are too low.

In order to circumvent this problem there has already been proposed a block code entailing dividing the data to be transmitted into consecutive blocks of M bits and coding each of the blocks by a word of (M+1) bits consisting of the M bits of the block complemented or not according to whether the encoded word on (M+1) bits which would be obtained without complementing features a disparity (the difference between the numbers of ones and of zeros) of the same sign or the opposite sign to that of the set of symbols already transmitted, to which is added a complement bit placed at the beginning of each block to indicate whether or not complementing has been applied. This type MB 1C code, as compared with multiple alphabet nBmB block codes, has the disadvantage of not permitting block synchronization recovery or error detection. One way of circumventing the block synchronization problem consists in adding to the beginning of each block of M bits already provided with its complement bit, prior to complementing (if applied) and transmission, a frame bit with the same value as the last bit of the block. This MB 1C 1F type code does not overcome the problem of detecting errors, which must be done by previous processing of the data using an error detection code and reduces the overall efficiency of transmission.

An objective of the present invention is a method for synchronous transmission of data using a code of the aforementioned MB 1C 1F type which further provides for error detection and which is easier to implement for high transmission bit rates than multiple alphabet nBmB type codes.

SUMMARY OF THE INVENTION

In one aspect, the invention consists in a synchronous data transmission method employing an MB 1C 1F type code in which the binary data to be transmitted is divided into successive blocks each of M bits (where M is an integer) each coded by a word comprising (M+2) bits made up of the M bits of the block, complemented or not according to whether the word which would be obtained without complementing would have a word digital sum WDS equal to the difference between the number of marks (logic 1) and spaces (logic 0) of the word of the same or opposite sign as the running digital sum RDS equal to the difference between the numbers of ones and zeros in the data already encoded, a complement bit C indicating whether complementing is applied or not and a frame bit complemented or not with the M bits of the block, whereby on decoding the blocks formed at the encoding stage may be reconstituted, in which method M is even and the value of the frame bit is determined according to the parity of each block of M bits.

In another aspect, the present invention consists in an encoder implementing the above method, comprising:
- a demultiplexer transforming the data to be transmitted into successive blocks of M bits,
- a circuit computing the word digital sum WDS and the parity of each block connected to the output of said demultiplexer,
- a complement decision circuit comparing the signs of the word digital sum WDS and the running digital sum RDS,
- a circuit computing the running digital sum RDS of the binary data already encoded on the basis of the output signal from said circuit computing the digital word sum and the output signal from said complementing decision circuit,
- a complementing circuit controlled by said complementing decision circuit processing the block of M bits available at the output of said demultiplexer and its parity bit delivered by said circuit computing the word digital sum and parity, and
- a multiplexer transforming into an isochronous binary data bit stream the words delivered by said complementing circuit to which has been added a complement bit delivered by said complementing decision circuit.

By definition, the frame bit provides for error detection within each block transmitted. It also renders constant the parity of the combinations formed by a block of M bits, a frame bit and a complement bit resulting from the encoding process. This property authorizes recovery of block synchronization at the receiving end since it provides for distinguishing the subdivision into blocks adopted at the transmission end from all other possible subdivisions. It also provides for monitoring the transmission error rate without block synchronization reacquisition by monitoring the continuous component which results in the parity signal obtained by dividing by two the received encoded pulse stream.

The definitions of the parity and complement bits are intended to simplify the encoding process and to provide for efficient error detection. In particular, they may be based on a choice of even or odd parity imposed on the combinations formed by a block of M bits, a frame bit and a complement bit resulting from the encoding process.

Other objects and advantages will appear from the following description of an example of the invention, when considered in connection with the accompanying drawings, and the novel features will be particularly pointed out in the appended claims.

DESCRIPTION OF THE PREFERRED EMBODIMENT

Figure 1:
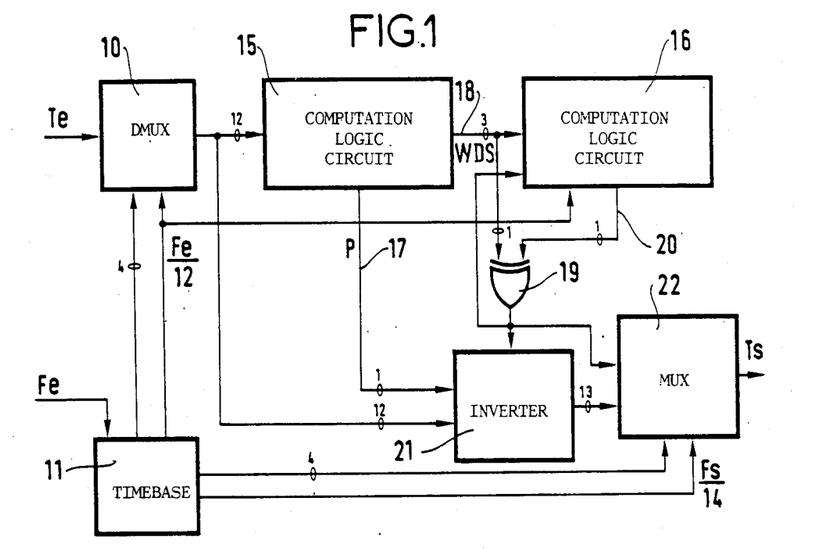
FIG. 1 is a block schematic of an encoder.

FIG. 1 is a schematic representation of an encoder using an MB 1C 1F type code in which the frame bit is a parity bit and in which the value of M is 12 by virtue of the possibilities for simplifying the encoding circuits which this value makes possible without unduly increasing the line bit rate. It will nevertheless be understood that the invention is not limited to this specific value for M.

The encoder receives an isochronous binary data bit stream Te to be encoded at a bit rate Fe and delivers at its output an encoded isochronous binary data bit stream Ts having a bit rate Fs equal to 7/6 times the input bit rate Fe. At its input it features a demultiplexer 10 which, under the control of a timebase 11 synchronized by the bit rate Fe of the incident binary data bit stream Te, transforms this stream into successive blocks of 12 parallel bits available at its output. Two computation logic circuits 15, 16 are connected to the output of the demultiplexer 10. The first 15 delivers at an output 17 the parity or frame bit of the code, hereinafter designated P, and on an output 18 the value of a digital sum with sign WDS corresponding to the binary word formed from the block of 12 bits available at the output of the demultiplexer 10 to which are added the parity bit P and a complement bit C preset to the logic level selected to indicate a non-complemented block. The second such circuit 16 receives on its input the word digital sum WDS delivered by the first computation logic circuit 15 and the output signal from a complementing decision circuit 19 and delivers on an output 20 the sign of the running digital sum RDS of the binary data bit stream Ts generated by the encoder. The complementing decision circuit 19 compares the signs of the word digital sum WDS and the running digital sum RDS respectively delivered by the two computation logic circuits 15, 16 and commands an inverter 21 operating on the block of 12 bits available at the output of the demultiplexer 10 and on the parity bit P available at the output of the first computation logic circuit 15. The 13-bit word that it delivers is applied, together with the command signal from the complementing decision circuit 19 constituting the complement bit C to be delivered, to a multiplexer circuit 22 which, under the control of the timebase 11, transforms the succession of 14-bit words that it receives into an isochronous binary data bit stream Ts with bit rate Fs equal to 7/6 Fe.

Figure 2:
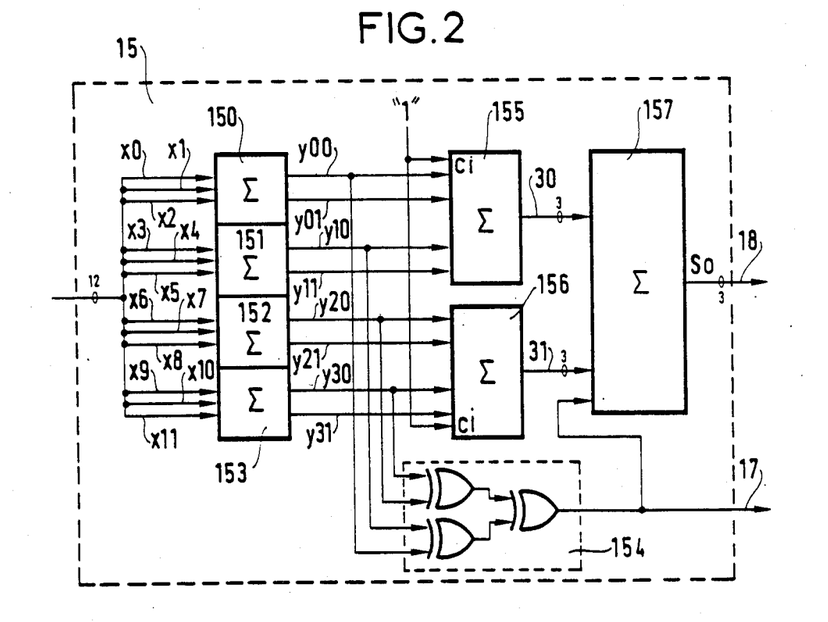
FIG. 2 is a schematic showing in detail a parity and word digital sum computer used in the encoder of FIG. 1.

The computation logic circuit 15 is shown in detail in FIG. 2. It comprises several cascaded binary adders. A first group of four full binary adders 150, 151, 152, 153, each adapted to add three binary numbers each of one bit, receives on its inputs the 12 parallel bits delivered by the demultiplexer 10. A partial adder 154 adapted to add four binary numbers each of one bit and delivering only the least significant bit of the addition result has its inputs connected to the least significant bit outputs of the four adders of the first group and provides at its output the parity bit P. A second group of two full adders 155, 156, each adapted to add two binary numbers each of two bits, adds pairs of numbers delivered by the first group of adders in the presence of a zero order carry consisting of logic 1 on their carry input Ci. A final full adder 157, adapted to add two binary numbers each of four bits, adds the numbers delivered by the adders 155, 156 of the second group in the presence of a zero order carry consisting of the value of the parity bit P.

The parity of the block of 12 bits available at the output of the demultiplexer 10 is that of the number of ones that it contains. In binary, it corresponds to the value of the least significant bit of the sum of the 12 bits of the block considered as 12 independent binary numbers each of one bit. This addition is carried out in two stages, during one of which the adders 150, 151, 152, 153 of the first group carry out four partial additions $y_0$, $y_1$, $y_2$, $y_3$ on sets of three of these 12 bits and during the other of which the partial adder 154 computes the value of the least significant bit of the sum of the least significant bits $y_{00}$, $y_{10}$, $y_{20}$, $y_{30}$ of the four partial sums.

As shown here, the partial adder 154 may consist of three cascaded exclusive-OR type logic gates each with two inputs. It generates a parity bit P at logic 1 or 0 according to whether the parity of the block of 12 bits is odd or even.

The word consisting of the block of 12 bits delivered by the demultiplexer 10 and its parity bit P is always of even parity. The 14-bit word consisting of the block of 12 bits delivered by the demultiplexer 10, its parity bit P and the complement bit C preset to a predetermined logic level in this instance equal to 1 is always of odd parity. This parity property is retained in the event of complementing by virtue of the even number of bits.

The word digital sum WDS prior to any complementing is proportional to the difference between the numbers of ones and of zeros in the word formed by the block of 12 bits available at the output of the demultiplexer 10, its parity bit P and its complement bit C. If the number of ones is $\alpha$ then the number of zeros is $14 - \alpha$ and the word digital sum WDS is expressed as follows:

$$WDS = k[\alpha - (14 - \alpha)]$$
$$= 2k(\alpha - 7)$$

In the above equations, k is an arbitrary coefficient of proportionality.

If $x_0$ through $x_{11}$ are the 12 bits available in parallel at the output of the demultiplexer 10, the number $\alpha$ is expressed by the equation:

$$\alpha = \sum_{i=0}^{11} x_i + C + P$$

If $y_0$ through $y_3$ are the partial sums executed by the respective adders 150, 151, 152, 153 of the first group:

$y_0 = x_0 + x_1 + x_2$
$y_1 = x_3 + x_4 + x_5$
$y_2 = x_6 + x_7 + x_8$
$y_3 = x_9 + x_{10} + x_{11}$ the number $\alpha$ is expressed as a function of the partial sums delivered by the adders of the first group by the equation:

$\alpha = y_0 + y_1 + y_2 + y_3 + C + P$

If $x_0$ and $x_1$ are the partial sums executed by the adders 155, 156 of the second group, the carry inputs of which are at logic 1:

$z_0 = y_0 + y_1 + 1$
$z_1 = y_2 + y_3 + 1$ the number $\alpha$ is expressed as a function of the partial sums delivered by the adders of the second group by the equation:

$\alpha = z_0 + x_1 + C + P - 2$

If $S_0$ is the sum executed by the final adder 157, the carry input of which receives the parity bit P:

$S_0 = z_0 + z_1 + P$ the number $\alpha$ is expressed as a function of $S_0$ by the equation:

$\alpha = S_0 + C - 2$ and consequently the word digital sum by the equation:

$WDS = 2k\ (S_0 + C - 9)$

Assuming, which is in fact the case, that the complement bit C is at logic 1 when it is added to the block of 12 bits delivered by the demultiplexer 10 and to its parity bit, the word digital sum WDS is expressed as a function of the number $S_0$ delivered at the output of the adder 157 by the equation:

$WDS = 2k\ (S_0 - 8)$

By way of simplification, the value of the constant k may be taken as ½. The sum $S_0$ delivered by the adder 157, equal to the sum of the 15 bits of the word formed by the block of 12 bits delivered by the demultiplexer 10, its parity bit P and the two carry bits, is expressed on four bits. The value of the word digital sum WDS is obtained by subtracting the value 8 from the sum $S_0$. In two's complement binary arithmetic on four digits, this subtraction is effected by adding 1000 so that the sum $S_0$ may be regarded as representing, in this arithmetic, the word digital sum assigned a negative sign. The negative sign may be ignored since it may be included in the value of the constant k which is then taken as equal to −½. Note also that the sum $S_0$ is even since it is equal to the sum of the number of ones provided by the block of 12 bits delivered by the demultiplexer 10 and its parity bit (an even number in this instance) and two ones added by the carry inputs of the adders 154, 155 and that in consequence of this the least significant bit of this sum $S_0$ is always at zero and may be ignored in computing the running digital sum and may be used for monitoring correct operation.

Figure 3:
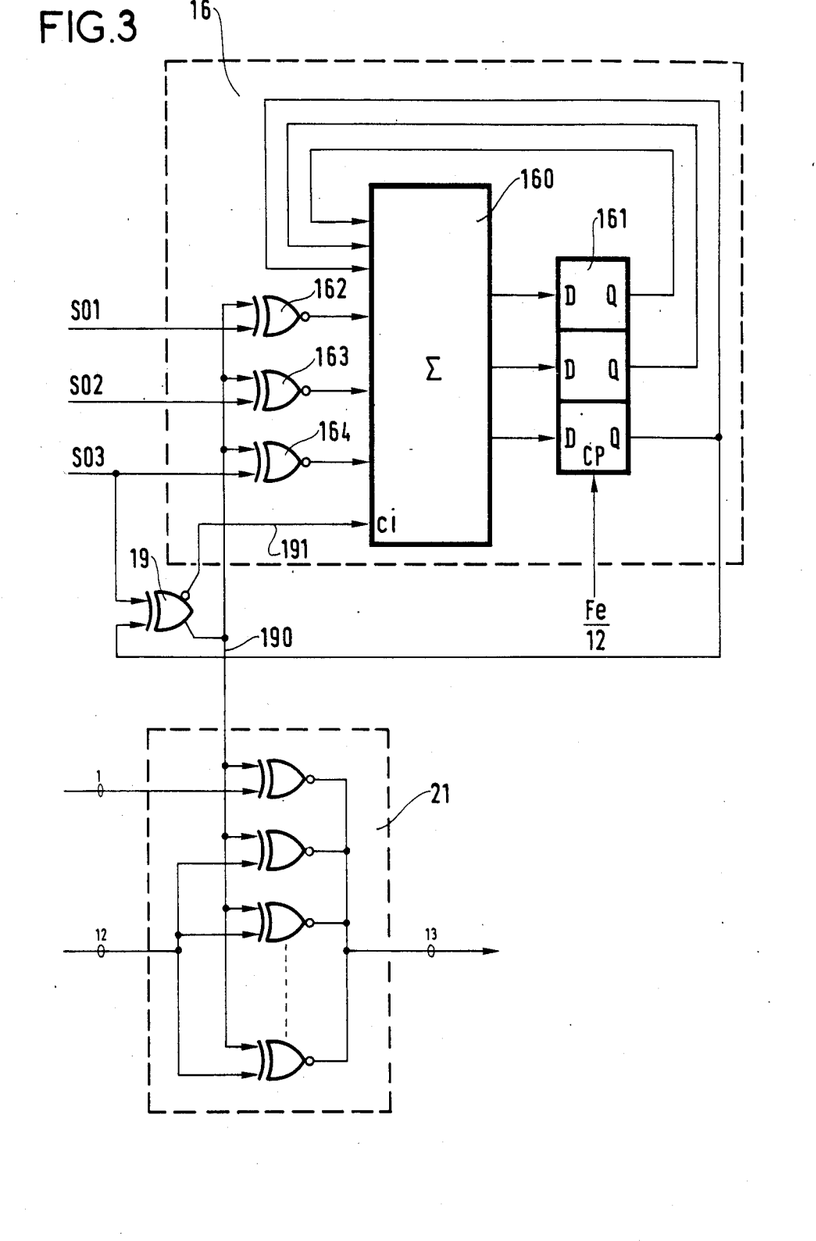
FIG. 3 is a schematic showing in detail a running digital sum computer and complementing circuit used in FIG. 1.

The logic circuit 16 for computing the running digital sum RDS of the data bit stream delivered by the encoder is shown in detail in FIG. 3. Its design is based on the fact that the word digital sum is supplied to it in two's complement binary arithmetic on three digits. It comprises a full binary adder 160 adapted to add two binary numbers each of three bits having its output looped to an input through the intermediary of parallel registers 161 loaded at the rate $F_e/12$ at which the blocks of 12 bits appear at the output of the demultiplexer 10 by a clock signal from the timebase 11. The remaining input of the adder 160 is connected to the output of the first computation logic circuit providing the sum $S_0$ through the intermediary of a sign multiplier commanded by the complementing decision circuit 19 and consisting of a battery of three exclusive-OR gates with complemented outputs 162, 163, 164. On instructions from the decision circuit 19, this sign multiplier executes or not one's complementing of the sum $S_0$ delivered by the first computation logic circuit. On each one's complementing of the sum $S_0$ a logic 1 is applied to the carry input of the adder to transform it to two's complementing and so effect the sign inversion.

Note that the adder 160 may be looped on itself because of the encoding principle adopted, a result of which is that a running digital sum RDS initialized to zero remains within the range of variation of the word digital sum WDS.

FIG. 3 also shows the two-input exlusive-OR type logic gate of the complementing decision circuit 19 which has a normal output 190 and a complemented output 191. One input of this logic gate is connected to receive the sign bit $S_{03}$ (most significant bit) of the sum $S_0$ delivered by the first computation logic circuit 15 while the other is connected to the output of the parallel registers 161 assigned to the most significant bit from the output of the adder 160. The normal output 190 delivers the complementing command signal C which controls the logic gates 162, 163, 164 effecting the one's complementing of the sum $S_0$ while the complemented output 191 is connected to the carry input of the adder 160.

When the word digital sum WDS has the same sign as the running digital sum RDS and it is necessary to complement the block of 12 bits delivered by the demultiplexer 10 and its parity bit P, the exclusive-OR logic gate 19 receives the same logic levels on both inputs. It then delivers on its normal output 190 a logic 0 assigning to the logic gates 162, 163, 164 an inverter function relative to the sum $S_0$ (one's complement) and on its complemented output 191 a logic 1 applied to the carry input of the adder 160 transforming the one's complement of the sum $S_0$ into a two's complement and thus commanding a subtraction operation. When the word digital sum WDS has the opposite sign to the running digital sum RDS and it is not necessary to complement the block of 12 bits delivered by the demultiplexer 10 and its parity bit P, the exclusive-OR logic gate 19 receives different logic levels on its two inputs. It then delivers logic 1 on its normal output rendering the logic gates 162, 163, 164 transparent in relation to the sum $S_0$ and logic 0 on its complemented output 191 thus commanding an addition operation.

FIG. 3 also shows the inverter circuit 21 which is made up of a battery of 13 exclusive-OR type logic gates with complemented outputs each having two inputs of which one is connected to the output 190 of the logic gate constituting the complementing decision circuit 19 and respectively receiving on the other inputs the 12 bits of the block delivered by the demultiplexer 10 and the parity bit P delivered by the first computation logic circuit 15. In relation to the block of 12 bits delivered by the demultiplexer 10 and the parity bit P, this battery of 13 logic gate behaves as a complementing circuit or as a transparent circuit according to whether it receives logic 0 or logic 1 from the complementing decision circuit 19.

Note that the choice of a particular subdivision of the incident data bit stream Te into blocks of 12 bits combined with the choice of a complement bit having the value logic 1 to indicate encoding without complementing provides for computing the word digital sum in two's complement binary arithmetic on four digits by simple natural binary addition of the number of ones in the block of 12 bits and its parity bit with the result increased by two units and that the choice of a parity bit transforming the block of 12 bits with which it is associated, together with the complement bit C, into a 14-bit word with odd parity provides for computing the running digital sum in two's complement binary arithmetic on three digits.

Alternatively, a complement bit may be used having the value logic 0 to indicate encoding without complementing and the word digital sum computed in an analogous manner but increasing by only one unit the natural binary sum. One method of reconciling these two cases consists in holding the carry input of one of the adders 155, 156 at logic 1 and the carry input of the other at the logic level corresponding for the complement bit C to the indication of a non-complemented block. In this case, the choice of a parity bit transforming the block of 12 bits with which it is associated, together with the complement bit C, into a 14-bit word with odd parity corresponds, for this parity bit, to a logic 0 or logic 1 according to whether the block of 12 bits is of odd or even parity. This parity bit may be obtained simply at a complemented output of the adder 154.

As a further alternative, encoded words of even parity may be formed. The word digital sum may be computed in an analogous manner to that described previously for odd parity encoded words. To compute the running digital sum the least significant bit of the sum $S_0$, which is then odd, may be ignored, so that in this case the computation is carried out, for 14-bit encoded words, in two's complement binary arithmetic on four digits rather than in two's complement binary arithmetic on three digits.

The error multiplication coefficient for such encoding, which is the ratio between the number of line errors and the number of errors after decoding, is equal to:

$$12 \times 1/14 + 12/14 = 1.71$$

This value is deduced from the fact that an error in a block of 12 bits does not provoke any other errors on decoding, that an error on the parity bit P disappears on decoding and that an error on the complement bit C produces 12 errors on decoding.

Figure 4:
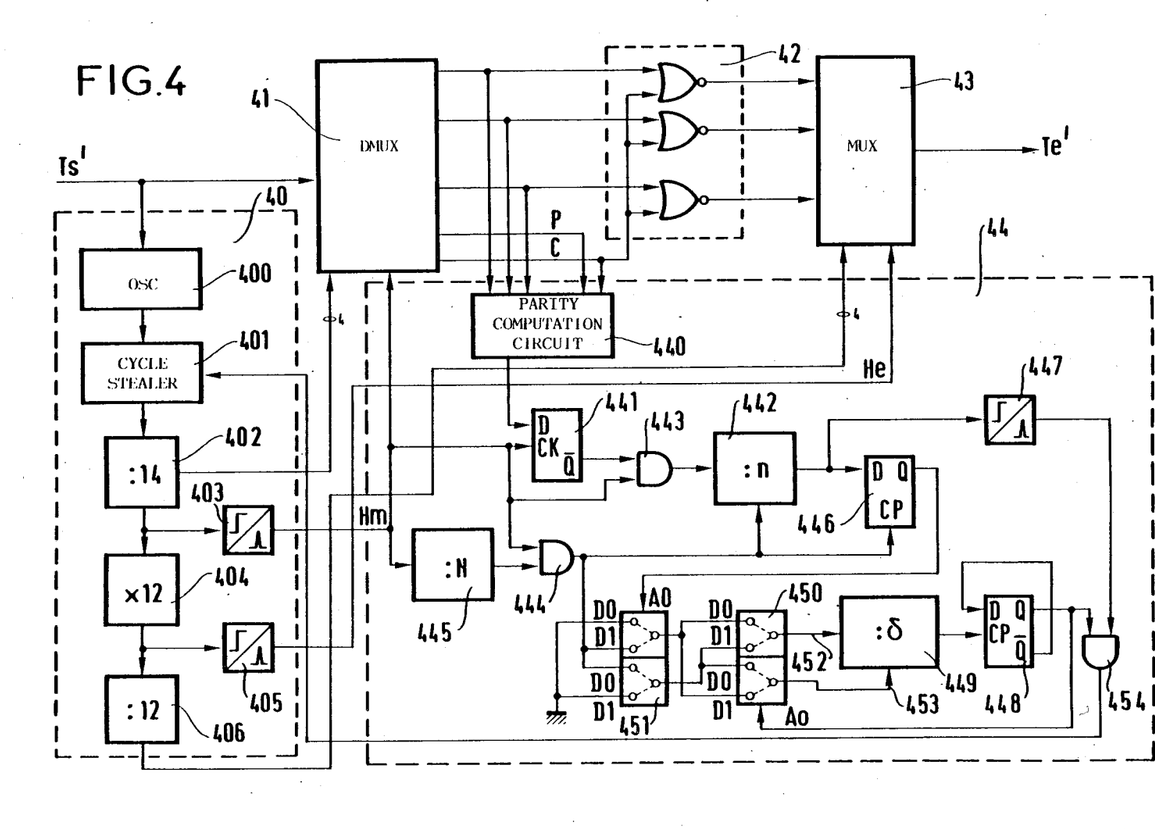
FIG. 4 is the schematic of a decoder matching the encoder of FIG. 1.

FIG. 4 is a schematic representation of a decoder matched to the encoder which has just been described. It receives an isochronous binary encoded data bit stream Ts' at a bit rate Fs' and delivers at its output a decoded isochronous binary data bit stream Te' having a bit rate Fe' equal to 6/7 times the input bit rate Fs'. At its input it features a timebase 40 producing, on the basis of the timing rate of the incident binary data bit stream Ts', a word clock pulse signal Hm synchronized on the subdivision into words of 14 bits used at the encoding stage and a bit clock pulse signal He defining the timing of the decoded bit stream Te', a demultiplexer 41 with its addressing control input connected to the timebase 40 and transforming, under the control of the word clock signal Hm, the incident encoded data bit stream into successive words of 14 bits in parallel with the same subdivision as that used at the encoding stage, an inverter circuit 42 at the output of the demultiplexer 41 complementing or not the part of each word corresponding to the block of 12 bits used at the encoding stage according to the value of the complement bit C marked by its position within a word, a multiplexer 43 with its addressing control input connected to the timebase 40, receiving successive blocks of 12 parallel bits delivered by the inverter circuit 42 and transforming them under the control of the bit clock signal He into a decoded synchronous binary data bit stream Te' and a word synchronization recovery circuit 44 which functions by stealing cycles from the timebase 40 and which monitors the parity of the 14-bit words delivered by the demultiplexer 41.

The timebase 40 produces a clock signal Hs at a frequency corresponding to the bit rate of the incident encoded data bit stream Ts' by means of an oscillator 400 phase-locked to the transitions in the incident data bit stream Ts'. This signal Hs is then applied through the intermediary of a cycle stealer circuit 401 to a divider by 14 402 which drives the addressing control input of the demultiplexer 41 and also delivers a signal at a frequency Fm which corresponds to the rate of succession of the 14-bit words used at the encoding stage and the rising edges of which are converted into word clock pulses Hm by a pulse generator 403. A multiplier 404 which increases the frequency by a factor of 12 connected to the output of the divider by 14 402 produces a signal at a frequency Fe' corresponding to the bit rate of the decoded binary data bit stream Te' and the rising edges of which are converted into bit clock pulses He by a pulse generator 405. A divider by 12 406 connected to the output of the multiplier 404 produces the signal controlling addressing of the multiplexer 43.

The cycle stealer circuit 401 is used to mask a cycle of the oscillator 400 on demand and thus to retard the word clock pulses Hm by the duration of a received symbol. It consists of an AND type logic gate, for example. This provides for modifying the relative locations of the symbols within the subdivision into 14-bit words until the correct subdivision is obtained.

The word synchronization recovery circuit 44 comprises a parity computation circuit 440 receiving the 14 parallel bits from the output of the demultiplexer 41 followed by an error quantizing circuit and a resynchronization control circuit.

The parity computation circuit 440 is not shown in detail as it is of conventional design. It is made up of a cascade of exclusive-OR logic gates, for example.

The error quantizing circuit reacts when the number of parity errors exceeds a predetermined integer n for N consecutive 14-bit words delivered by the demultiplexer 42. It comprises a D flip-flop 441 connected to the output of the parity computation circuit 440 and clocked by the word clock pulses Hm, a presettable scale of n downcounter 442 receiving the word clock pulses Hm on a decrement input controlled by an AND type logic gate 443 driven by the complemented output Qof the D flip-flop 441 and on a preset to n input controlled by an AND type logic gate 444 driven by a divider by N 445 receiving the word clock pulses Hm, a D flip-flop 446 storing the output state of the downcounter 442 before each presetting to n and a pulse generator 447 delivering a positive pulse each time the downcounter 442 arrives at zero.

The AND type logic gate 444 associated with the divider by N 445 selects one word clock pulse Hm every N consecutive 14-bit words delivered by the demultiplexer 41. This is used to reset the downcounter 442 which in the meantime is decremented by each parity error (logic 0 at output of parity computation circuit 440 indicating the appearance at the output of the demultiplexer 41 of a word with the opposite parity to that selected for the encoded words) and delivers an output signal normally at logic 0 but going to logic 1 as soon as the count value reaches 0.

The pulse generator 447 transforms rising edges of the output signal from the downcounter 442 into positive pulses for commanding the cycle stealer circuit 401 to block transmission of a cycle of the oscillator 400 so as to retard by a period equal to that of one bit of the incident bit stream Ts' the word clock pulses Hm determining the subdivision of the received bit stream Ts' into 14-bit words.

The resynchronization control circuit controls through the intermediary of an AND type logic gate 454 transmission of the pulses from the pulse generator 447 in such a way as to authorize it only if there have been more than n parity errors in δ consecutive groups of N words delivered by the demultiplexer 41 in which case loss of word synchronization is acknowledged, and so as to block transmission of the pulses from the pulse generator 447 as soon as the number of parity errors becomes less than n in δ consecutive groups of N words.

In addition to the AND type logic gate 454, the resynchronization control circuit comprises a D flip-flop 448 configured as a divider by two controlling through its output Q the logic gate 454, a presettable scale of δ downcounter 449 connected by its output to the clock input of the D flip-flop 448 and two 2-stage selectors 450, 451 in cascade respectively driving the decrement input 452 and preset input 453 of the downcounter 449. The selector 450 is configured as an inverter driving the decrement input 452 and the preset input 453 of the downcounter 449 and is commanded by the output Q of the D flip-flop 448. The other selector 451 is configured as a switch for applying to one or other of its stages, exclusively, the word clock pulses Hm selected by the AND type logic gate 444 and commanded by the D flip-flop 446.

Like the previous downcounter, the downcounter 449 produces at its output a logic 0 which goes to logic 1 when the count reaches the null value, this transition causing the D flip-flop 448 to change state.

A logic 0 at the output of the D flip-flop 448 blocks the logic gate 454 and reflects word synchronization alignment. It commands the addressing of the selector 450 so as to route, in cooperation with the selector 451, the word clock pulses Hm delivered every N consecutive words by the logic gate 444 either to the decrement input 452 if they correspond to groups of N words for which more than n parity errors have been detected in each, or to the input 453 for presetting the count to δ if they correspond to groups of N words of which none comprises more than n parity errors.

A logic 1 at the output of the D flip-flop 448 releases the logic gate 454 and reflects a word synchronization acquisition process following loss of alignment. It controls the addressing of the selector 450 in such a way as to route, in cooperation with the selector 451, the word clock pulses Hm delivered every N consecutive words by the logic gate 444 either to the decrement input 452 if they correspond to groups of N words none of which comprises more than n parity errors or to the input 453 for presetting the count to δ if they correspond to groups of N words of which each comprises more than n parity errors.

The integer values n, N and δ are chosen to optimize parameters such as invulnerability to line errors (interval between θ false declarations of loss of word synchronization due to line errors), probability of false recovery of word synchronization and word synchronization re-acquisition time.

When word synchronization is acquired, the parity constitutes a measure of the line error rate.

It will be understood that various changes in the details, materials and arrangements of parts which have been herein described as illustrated in order to explain the nature of the invention may be made by those skilled in the art within the principle and scope of the invention as expressed in the appended claims.

There is claimed:

1. A synchronous data transmission method employing an MB 1C 1F type code for coding each M bits of binary data to be transmitted into an M+2 bit code word, said method steps of:
   dividing the binary data to be transmitted into successive blocks of M bits each (where M is an even integer);
   adding to each block a frame bit and a complement bit to form an intermediate word, said frame bit having a value determined in accordance with a parity of each block of M bits;
   determining a word digital sum (WDS) in accordance with the difference between the number of marks (logic 1) and spaces (logic 0) of said intermediate word and complement bit;
   determining a running digital sum (RDS) in accordance with the difference between the number of ones and zeros in the data already encoded;
   complementing said intermediate word in accordance with a comparison of the signs of WDS and RDS, while changing the value of said complement bit, if necessary, to indicate whether said intermediate word has been complemented or not; and
   combining said complement bit and said complemented intermediate word to form an output code word to be transmitted having M+2 bits.

2. Method according to claim 1, wherein the value of M is 12, the complement bit C is at logic 1 to indicate a non-complemented block or at logic 0 to indicate a complemented block, and the word digital sum WDS computed at the encoding stage to decide whether or not to complement the blocks is produced in two's complement binary arithmetic by natural binary addition of the logic ones of the block concerned and its frame bit, with the sum increased by two units.

3. Method according to claim 1, wherein the value of M is 12, the complement bit C is at logic 0 to indicate a non-complemented block or at logic 1 to indicate a complemented block, and the word digital sum WDS computed at the encoding stage to decide whether or not to complement the blocks is produced in two's complement binary arithmetic by natural binary addition of the logic ones of the block concerned and its frame bit, with the sum increased by one unit.

4. Method according to claim 1, wherein the frame bit is a parity bit transforming the associated block of M bits with its complemented bit C into an odd parity word of (M+2) bits.

5. Method according to claim 4, wherein the value of M is 12, the complement bit C is at logic 1 to indicate a non-complemented block and at logic 0 to indicate a complemented block, the running digital sum RDS computed at the endcoding stage to decide whether or not to complement the blocks is produced in two's complement binary arithmetic by algebraic addition of the word digital sums WDS produced for each block by natural binary addition of the logic ones of the block concerned and its frame bit, with the sum increased by two units and with the sign changed in the event that the block is complemented, the least significant bit of each word digital sum WDS being ignored.

6. Method according to claim 4, wherein the value of M is 12, the complement bit C is at logic 0 to indicate a non-complemented block and at logic 1 to indicate a complemented block, the running digital sum RDS computed at the encoding stage to decide whether or not to complement the blocks is produced in two's complement binary arithmetic by algebraic addition of the word digital sums WDS produced for each block by natural binary addition of the logic ones of the block concerned and its frame bit, with the sum increased by one unit and with the sign changed in the event that the block is complemented, the least significant bit of each word digital sum WDS being ignored.

7. Method according to claim 1, wherein the frame bit is a parity bit transforming the associated block of M bits with its complement bit C into an even parity word of (M+2) bits.

8. Method according to claim 7, wherein the value of M is 12, the complement bit C is at logic 1 to indicate a non-complemented block and at logic 0 to indicate a complemented block, the running digital sum RDS computed at the encoding stage to decide whether or not to complement the blocks is produced in two's complement binary arithmetic by algebraic addition of the word digital sums WDS produced for each block by natural binary addition of the logic ones of the block concerned and its frame bit, with the sum increased by two units and with the sign changed in the event that the block is complemented.

9. Method according to claim 7, wherein the value of M is 12, the complemented bit C is at logic 0 to indicate a non-complemented block and at logic 1 to indicate a complemented block, the running digital sum RDS computed at the encoding stage to decide whether or not to complement the blocks is produced in two's complement binary arithmetic by algebraic addition of the word digital sums WDS produced for each block by natural binary addition of the logic ones of the block concerned and its frame bit, with the sum increased by one unit and with the sign changed in the event that the block is complemented.

10. A method according to claim 1, further comprising the step of reconstituting said blocks, said reconstituting step including the step of monitoring a parity error rate, wherein the division into blocks effected at the encoding stage is reconstituted at the decoding stage by monitoring the parity error rate.

11. An encoder for implementing a synchronous data transmission method employing an MB 1C 1F type code in which the binary data to be transmitted is divided into successive blocks each of M bits (where M is an integer) each coded by a word comprising (M+2) bits made up of the M bits of the block, complemented or not according to whether the word which would be obtained without complementing would have a word digital sum WDS equal to the difference between the number of marks (logic 1) and spaces (logic 0) of the word of the same or opposite sign as a running digital sum RDS equal to the difference between the numbers of ones and zeros in data already encoded, a complement bit C indicating whether complementing is applied or not and a frame bit complemented or not with the M bits of the block, whereby on decoding the blocks formed at the encoding stage may be reconstituted, in which method M is even and the value of the frame bit is determined according to a parity of each block of M bits, the encoder comprising:
a demultiplexer for transforming the data to be transmitted into successive blocks of M bits,
a circuit for computing the word digital sum WDS and the parity of each block connected to the output of said demultiplexer,
a complementing decision circuit for comparing the signs of the word digital sum WDS and the running digital sum RDS,
a circuit for computing the running digital sum RDS of the binary data already encoded on the basis of the output signal from said circuit computing the digital word sum and the output signal from said complementing decision circuit,
a complementing circuit controlled by said complementing decision circuit, said complementing circuit processing the block of M bits available at the output of said demultiplexer and its parity bit delivered by said circuit computing the word digital sum and parity, and
a multiplexer for transforming into an isochronous binary data bit stream the words delivered by said complementing circuit to which has been added a complement bit delivered by said complementing decision circuit.

12. Encoder according to claim 11, wherein the value of M is 12 and said circuit computing the word digital sum WDS and parity comprises:
a first group of four full binary adders adapted to add three binary numbers each of one bit receiving on their individual inputs 12 parallel bits of each block delivered by said demultiplexer,
a second group of two fully binary adders one of which is adapted to add two two-bit binary numbers with a first carry input and another of which is adapted to add two two-bit binary numbers with a second carry input, each of said one and another adders adding pairs of binary numbers delivered by said first group of adders,
a full binary adder adapted to add two binary words each of four bits with a third carry input adding binary numbers delivered by said second group of adders and delivering the word digital sum WDS, and a parity computation circuit the output signal of which is fed to one of said first, second and third carry inputs, another of said carry inputs being held at logic 1 and a last of said carry inputs being held at a logic level corresponding for the complement bit to the indication of a non-complemented block.

* * * * *